(12) United States Patent
White

(10) Patent No.: US 6,578,897 B2
(45) Date of Patent: Jun. 17, 2003

(54) DEPLOYMENT MECHANISM FOR TARPING SYSTEM

(75) Inventor: Jeff White, Fishers, IN (US)

(73) Assignee: Aero Industries, Inc., Indianapolis, IN (US)

(*) Notice: Subject to any disclaimer, the term of this patent is extended or adjusted under 35 U.S.C. 154(b) by 0 days.

(21) Appl. No.: 09/797,160

(22) Filed: Mar. 1, 2001

(65) Prior Publication Data
US 2002/0140248 A1 Oct. 3, 2002

(51) Int. Cl.$^7$ ................................................. B60P 7/04
(52) U.S. Cl. ....................................................... 296/98
(58) Field of Search .......................................... 296/98

(56) References Cited

U.S. PATENT DOCUMENTS

| | | | |
|---|---|---|---|
| 3,168,345 A | | 2/1965 | Roberts et al. |
| 3,628,826 A | | 12/1971 | Sibley |
| 3,841,697 A | | 10/1974 | McFarland |
| 3,975,047 A | | 8/1976 | McClellan |
| 4,341,416 A | | 7/1982 | Richard |
| 4,409,888 A | * | 10/1983 | Weyer ........................... 92/31 |
| 4,477,202 A | * | 10/1984 | Price ........................... 403/316 |
| 4,509,408 A | * | 4/1985 | Kuroda ............................. 92/2 |
| 4,516,802 A | | 5/1985 | Compton |
| 4,603,616 A | * | 8/1986 | Zajac ............................. 92/33 |
| 4,874,196 A | | 10/1989 | Goldstein et al. |
| 4,981,317 A | | 1/1991 | Acosta |
| 5,031,955 A | | 7/1991 | Searfoss |
| 5,058,956 A | | 10/1991 | Godwin, Sr. |
| 5,340,187 A | * | 8/1994 | Haddad, Jr. .................. 296/98 |
| 5,941,324 A | * | 8/1999 | Bennett ......................... 175/85 |

OTHER PUBLICATIONS

"HELAC Actuator Product Description", date unknown.
Roll–Rite Corporation, "Do it Right with Roll.Rite," p. 6, (Jul. 27, 1996).
Pioneer Cover–All, "H–2100 Hydraulic Tarping System—Sell Sheet.," p. 2.
Aero Industries, Inc., "Easy Cover," p. 6, (Jul. 27, 1999).
Pioneer Consolidated Corp., "the Hydra Cover Pioneer Cover–All," p. 4, (May 1, 1990).
Pioneer Consolidated Corp., "The Hydra Cover From Pionner Cover–All," p. 1,.
Pioneer Cover–All, "Pioneer Telescoping Low–Arm," p. 5, (Jul. 27, 1995).
Pioneer Cover–All, "Rack 'n Pinion Tarping Systems.," p. 4,.
Pioneer Cover–All, "Tarping Systems," p. 6,.
Roll–Rite, "Do It Right Roll–Rite Tarp Systems & Components," p. 7, (Jul. 27, 1997).
Donovan Enterprises, "Rolloff Covering Systems.," p. 4,.
O'Brian Manufacturing, "Autocover II–C Low Profile Catalog Sheet and Parts Sheet," p. 2,.
North Carolina Hydra–Tarp, "Hydra–Tarp Installation Book and Parts List for Models HT–100–13 and HT–100–21," p. 21.
Advanced Tarping Technologies Mfg., "Pulltarps—Catalog Book," p. 20, (May 27, 1998).

\* cited by examiner

Primary Examiner—Dennis H. Pedder
(74) Attorney, Agent, or Firm—Maginot, Moore & Bowman

(57) ABSTRACT

A deployment mechanism for a stowable tarping system includes a hydraulic rotary actuator that is connected to the ends of the bail member of the tarping system. The rotary actuator is generally centrally mounted on the underside of the vehicle body with a pair of half shafts projecting outward toward the sides of the vehicle body. The half shafts are rotationally connected to the bail member so that torque and rotational force generated by the actuator is translated to a pivoting movement of the bail member. The actuator can be integrated into the vehicle hydraulics and can include a control valve system capable of controlling speed and direction of actuation.

15 Claims, 6 Drawing Sheets

DEPLOYMENT MECHANISM FOR TARPING SYSTEM

BACKGROUND OF THE INVENTION

The present invention relates to covers or tarping systems for open-topped containers. More specifically the invention relates to a system for the deployment of such covers over the container body.

Most hauling vehicles, such as dump trucks, include open-topped containers used for hauling or storing various materials. For example in a typical dump truck application, the dump body is used to haul a variety of particulate material, such as gravel, aggregate or similar products.

Depending upon the nature of the material stored in the open-topped container, it is usually desirable to provide a cover for the container. The industry has gravitated toward flexible tarping systems that can be wound and unwound from a spool to cover the container top. The flexible tarpaulin can be easily stowed at the front of the vehicle when the cover is not necessary, such as when the dump bed is being loaded.

A variety of tarping systems have been developed that are geared to a wide range of hauling vehicle applications. One such system for use with dump trucks is the Easy Pull® Tarping System of Aero Industries, Inc. The Easy Pull® System includes a flexible tarp that is wound around a spool at one end of the dump bed. A rope attached to the free end of the tarp can be used to unwind the tarp from the roller to extend the length of the bed. The spool can include a torque spring that provides a recoil or return force to wind the tarp around the spool when it is no longer in use.

Another cover system particular suited for open-topped containers is the Easy Covers® System, also of Aero Industries, Inc. The Easy Cover® Tarping System includes a U-shaped bail member that is pivotably mounted at its ends to the base of the container body. The horizontal section of the U-shaped bail member is attached to the tarp. In one application of the Easy Cover® Tarping system, pulling the horizontal bar of the U-shaped bail member using a rope can manually deploy the tarp. Again, the tarp can be wound onto a spring-biased spool at the front end of the dump bed.

As with many flexible tarping systems, the Easy Cover® System can include an actuation mechanism that automatically pivots the U-shaped bail member to deploy the tarp over the load of the open-topped container. One common deployment mechanism is a series of springs connected to the base of the U-shaped bail. One example is depicted in FIG. 1. Specifically, a vehicle 10 includes an open-topped body 11 covered by a flexible tarpaulin 13. The tarp 13 can be wound onto a tarp roller 14 situated at the front of the vehicle bed.

A bail member 16 is connected to the free end of the tarp. An actuation or deployment mechanism 17 can be used to mount the base of the bail member 16 to the vehicle bed 11. The actuation mechanism 17 can take many forms. For instance, the mechanism can comprise the torsion springs discussed above. In another version, a hydraulic cylinder-driven rack and pinion mechanism is utilized. In a more direct system, a hydraulic cylinder is mounted to the outside of the vehicle body 11 and actuated to forcefully pivot the bail arms relevant to the truck body.

In another version depicted in FIG. 2 a hydraulic cylinder mechanism is mounted to the underside of the vehicle bed. Specifically, a hydraulic actuator 20 is pivotably mounted to a lower vehicle frame member 23 by way of a pivot mount 24. The hydraulic actuator 20 includes an extension rod 26 that reciprocates within the cylinder of the actuator. A bracket 27 is mounted to the free end of the extension rod 26. This bracket is pivotably attached to an actuation lever 28 that is connected to an arm of the bail member 16 by a pivot pin 29 passing through the vehicle frame member 23. The pivot pin 29 is specifically configured so that the bail member arm 16 pivots with the actuation lever 28.

In operation, as the extension rod 26 is withdrawn into the actuator 20, it causes the actuation lever 28 to pivot, which ultimately causes the bail member 16 to pivot. With this configuration, the hydraulic actuator and actuation mechanism extends below the bottom of the vehicle body 11. Moreover, two such actuators are often required, one for each side of the vehicle. Furthermore, the system depicted in FIG. 2 relies upon the length of the actuation lever 28 to provide a moment arm to generate sufficient torque while pivoting or rotating the bail member 16. Finally, systems of this type are highly susceptible to the harsh environment existing underneath the truck body—namely, dirt, water and impact damage.

There is therefore a need for a deployment mechanism for use with a flexible tarping system that can be easily and compactly installed on a truck body. In addition, there is need for such a system that is protected from the elements, and that is capable of generating sufficient amounts of torque to deploy flexible tarps of various lengths.

SUMMARY OF THE INVENTION

In order to address the needs left unfulfilled by prior devices, the present invention contemplates a hydraulic rotary actuator that is generally centrally mounted on the underside of the container body. The actuator is connected by a pair of half shafts to the legs of the bail member to permit the transmission of rotational motion and torque from the actuator to the bail member. The rotary actuator is in the form of a compact elongated cylinder that is less susceptible to the harsh environment at the vehicle undercarriage.

In one feature, the rotary actuator includes a pair of half shafts that are connected to opposite ends of an actuation shaft. The actuator also includes a piston disposed in within the cylinder chamber that divides the chamber into two portions. Each portion includes its own fluid inlet that can be alternatively connected to a source of pressurized fluid. A helical spline arrangement is defined between the piston and the actuation shaft so that linear movement of the piston results in rotation of the actuation shaft. The linear movement of the piston is calibrated to produce a pre-determined amount of rotation of the actuation shaft, which ultimately corresponds to sweeping the bail member through an appropriate arc to fully deploy the cover.

In a further aspect of the invention, a control valve system is provided between the fluid inlets to the hydraulic rotary actuator and the source of pressurized fluid. Preferably, the source is the vehicle hydraulic system. The control valve system can include flow control valves associated with each inlet that are operable to vary the fluid flow rate from each inlet. This metered out flow rate can control the rate of rotation of the actuation shaft, and ultimately the bail member, in the deployment and retraction directions. The control valve system also includes a manually controllable three-position four-way solenoid valve that controls the flow of fluid into and out of the two inlets. In one embodiment, the solenoid valve connects or disconnects one inlet from the fluid source, and either closes or opens the second inlet to drain.

One benefit of the present invention is that the deployment or actuation mechanism for the tarping system is capable of providing torque directly to the bail member. Another benefit is that the actuator can be mounted to the underside of the container body in an orientation that helps protect the actuator from the elements.

A further benefit is that the rotary actuator aspect allows the actuation mechanism to maintain a reduced envelope beyond the sides of the vehicle to readily comply with various vehicle size regulations. Still another benefit is that the hydraulic actuator can accommodate a wide range of bail arm sweep angles depending upon the geometry of the truck body. Other benefits and certain objects of the invention will become apparent upon consideration of the following written description and accompanying figures.

DESCRIPTION OF THE PREFERRED EMBODIMENTS

Figure 1:
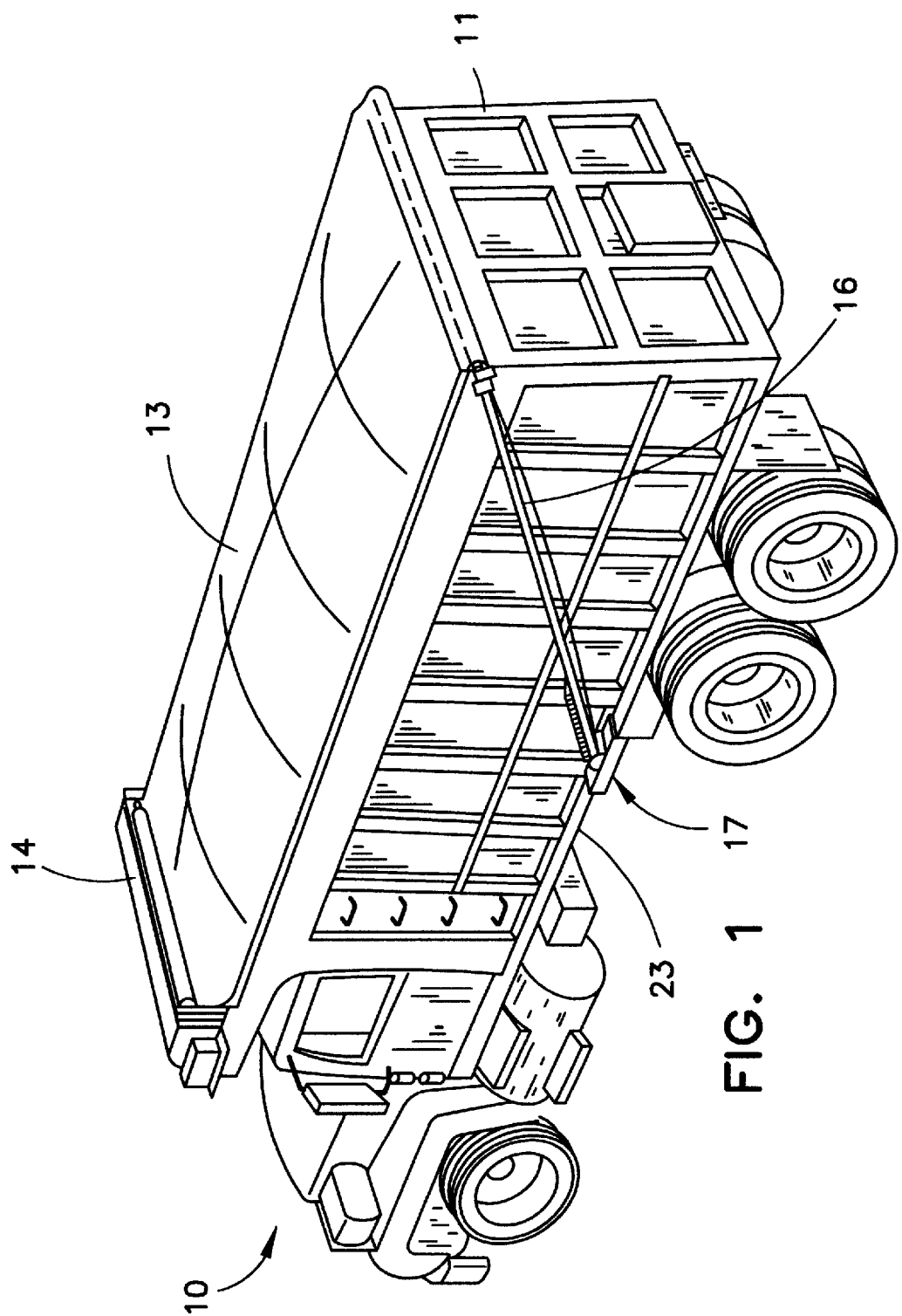
FIG. 1 is a top perspective view of a hauling vehicle utilizing a flexible tarpaulin cover.
Figure 2:
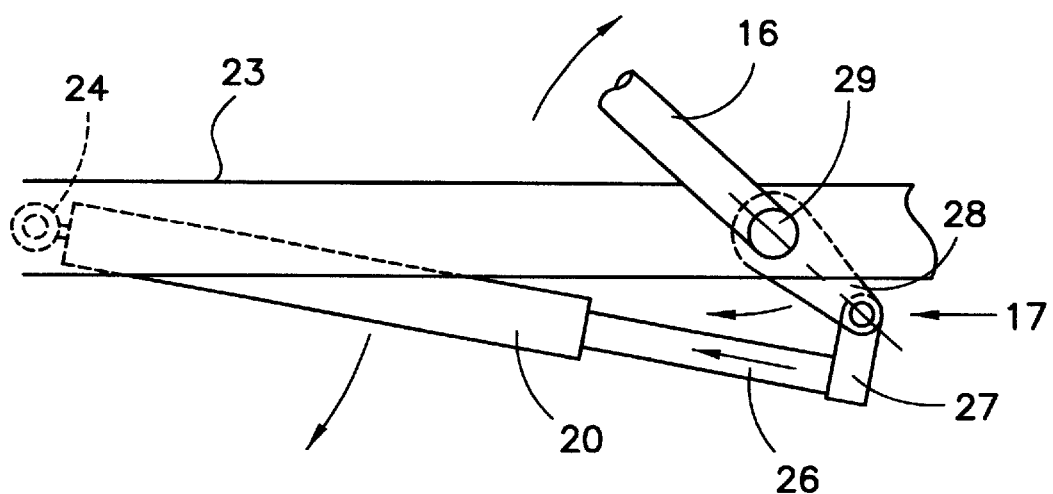
FIG. 2 is a side elevational view of a prior art deployment mechanism.
Figure 3:
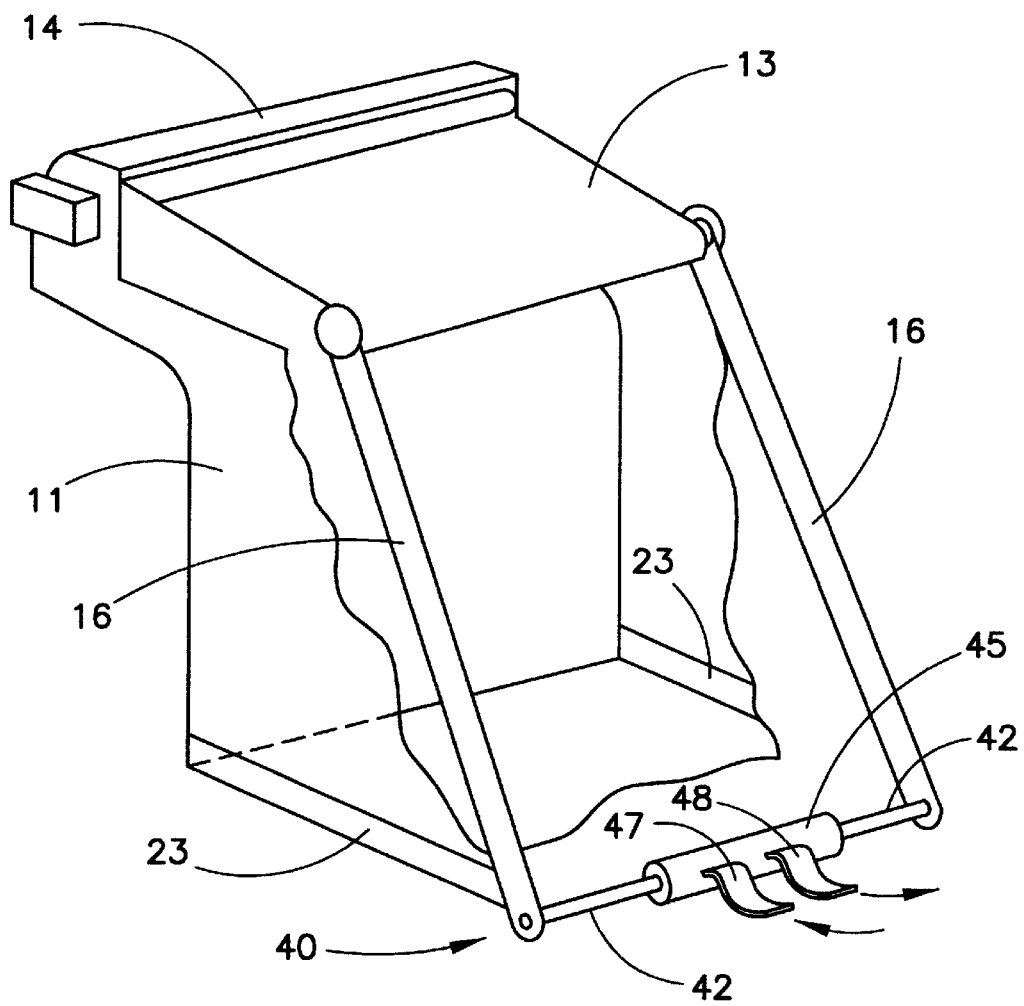
FIG. 3 is a top perspective cut-away view of one embodiment of the deployment mechanism according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

In accordance with one important feature of the present invention, the deployment mechanism for the flexible tarp utilizes a hydraulic rotary actuator that is connected to the ends of the bail member by way of a pair of half shafts. The actuator directly applies a torque and rotational force to the half shafts, which is translated to a pivoting movement of the bail member arms. In one aspect of the invention, the deployment mechanism is mounted between frame members of the vehicle directly adjacent to the floor of the vehicle bed. In this way, the deployment mechanism is well protected from the elements and from impact damage.

In accordance with one embodiment of the invention, and actuation or deployment mechanism 40 is shown mounted to the floor 12 of the vehicle body 11 between the vehicle frame members 23 at the sides of the body. In the preferred embodiment, the deployment mechanism 40 includes a pair of half shafts 42 that are attached to the base of the bail member arms 16 in a suitable manner so that the arms pivot directly with rotation of the half shafts 42. Preferably, the frame members 23 include a bushing that supports the end of each half shaft, or that supports the rotational connection between the arms of the bail member and each half shaft. The bushing is configured to permit reduced friction rotation of the half shaft as the bail member is pivoted.

Figure 4:
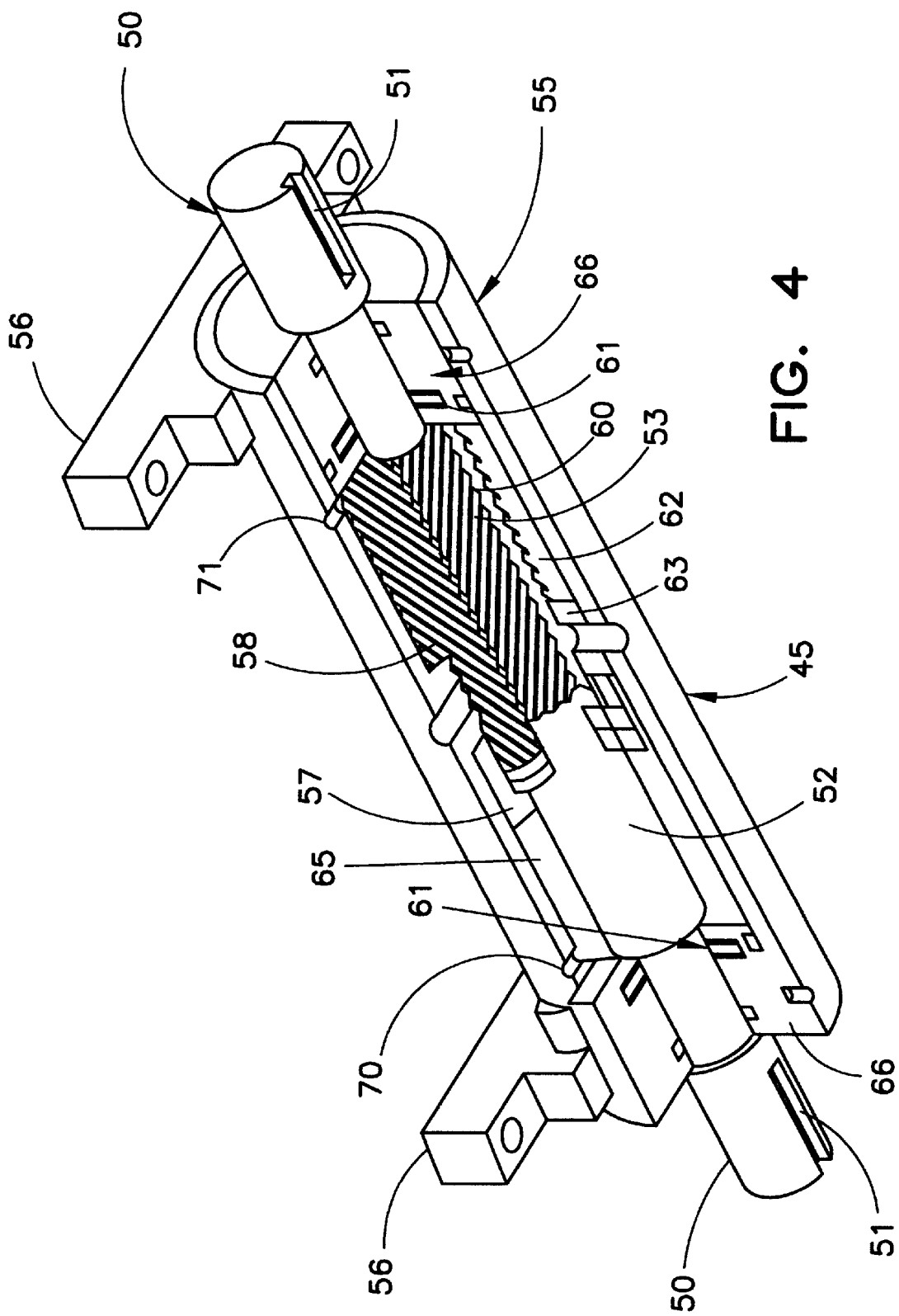
FIG. 4 is a partial cut-away view of a hydraulic rotary actuator used in the embodiment of the invention depicted in FIG. 3.

The deployment mechanism 40 further includes a helical rotary actuator 45, which operates on hydraulic fluid entering and exiting the actuator by way of fluid line 47 and 48. Details of one specific embodiment of the helical rotary actuator 45 are shown in FIG. 4. The two half shafts 42 are each attached to shaft mounts 50 situated at opposite ends of the actuator 45. The engagement between the half shafts 42 and the shaft mounts 50 can be of a known configuration that is sufficient to transmit torque and rotational motion between the shaft mounts 50 and the half shafts 42. In one specific embodiment, the shaft mounts 50 include an elongated slot 51 that is configured to receive a pin (not shown) extending through the corresponding half shaft 42 into the slot 51. This pin rotationally fixes the half shaft relative to the shaft mount 50, while allowing the half shaft to slide axially along the mount. In this way, the interface between the half shafts 42 and the shaft mounts 50 can accommodate variations in the distance between the actuator 45 and the vehicle frame members 23.

The two shaft mounts 50 are integral with or fixed to opposite ends of an actuation shaft 52 that extends through the length of the actuator housing 55. The actuation shaft 52 is supported for rotation within the housing by a pair of bearings at the opposite ends of the shaft. A portion of the actuation shaft 52 defines a helical gear pattern 53, for purposes described herein.

In the preferred embodiment, the actuator 45 includes a housing 55 with an array of mounting flanges 56. The actuation mechanism can be mounted to the floor 12 of the vehicle body 11 by bolts passing through the flanges 56, or by other suitable mounting means. When the actuator 45 is mounted to the underside of the vehicle body 11, the length of the half shafts 42 can be calibrated to extend from the shaft mounts 50 to the vehicle frame members 23.

Figure 6:
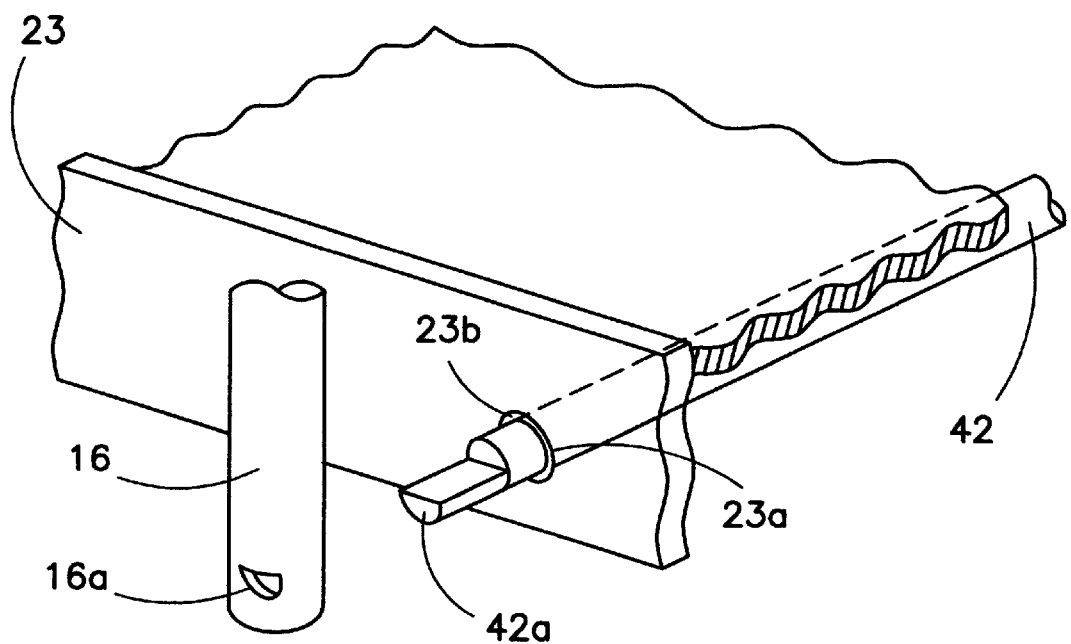
FIG. 6 is a perspective view of an engagement of a half shaft, frame member, and bail arm.

Preferably the half shafts can include a keyed portion that passes through a bearing opening in the vehicle frame member 23 and engages a correspondingly shaped opening in the base of the bail member arms 16. One such specific configuration is depicted in FIG. 6. In particular, the half shaft 42 includes a truncated-keyed portion 42a. The bail member arm 16 includes a similarly configured opening 16a through which the keyed portion 42a can project. The keyed portion 42a can be held in place by way of a cotter pin, or can be threaded for engagement by a nut or internally threaded for fixation by a bolt.

The half shaft 42 in the specific embodiment FIG. 6 extends through an opening 23a in the vehicle frame member 23. Preferably, a pivot bushing 23b is mounted within the opening of 23a to provide a reduced friction pivot surface for a rotation of the half shaft 42. It is understood that while the embodiment of FIG. 7 depicts an arrangement passing through the vehicle frame, a separate pivot mount can be fixed to the underside of the vehicle body 11 to accomplish the same function.

Returning to FIG. 4, the details of the actuator 45 will be explained. In addition to the actuation shaft 52, the helical rotary actuator 45 includes an actuation piston 57 that is slidably mounted within the housing 55. An actuation sleeve 58 is attached to the piston 57. The sleeve 58 includes inner helical splines 60 that mate with a helical gear pattern 53 on the actuation shaft 52. The actuation piston 57 and its associated sleeve 58 are configured to translate along the length of the housing 55. As the piston translates the inner helical splines 60 react with the helical gear pattern 53 to cause the actuation shaft 52 to rotate. The distance of travel of the actuation piston 57 determines the rotational arc for the actuation shaft 52. In one embodiment, this distance of travel is calibrated so that the actuation shaft 52, and ultimately the bail arms 16 connected thereto, sweep through an angular distance sufficient to fully deploy the tarp 13. In a specific embodiment, the actuation shaft 52 rotates through about 120°.

In an alternative embodiment, the actuation sleeve 58 also includes an outer helical spline 62. This outer spline integrates with similar splines formed on the interior of a rotation block 63 that is fixed within the housing 55. With this configuration, axial movement of the piston 57 relative to the housing causes the actuation sleeve 58 to rotate relative to the rotation block 63. This rotation is superimposed on the rotation generated by the passage of the inner helical spline 60 over the helical gear pattern 53 of the actuation shaft 52. With this configuration the angle of rotation of the actuation shaft 52 is increased. Again, the axial travel of the actuation piston 57 ultimately determines the angular range of motion of the bail arms 16.

In the preferred embodiments, the actuator 45 is hydraulically operated. Specifically, the housing 55 defines a hydraulic chamber between end caps 66 mounted at the ends of the housing. The actuation piston 57 essentially divides the chamber into two portions. Each portion is connected to a source of hydraulic through a fluid inlet 70, and 71, respectively. Introducing of hydraulic fluid through one inlet or the other causes the actuation piston 57 to translate accordingly. With this configuration, both inlets 70 and 71 can determine the direction of rotation of the actuation shaft 52. As shown in FIG. 4, movement of the actuation piston 57 from left to right in the figure causes a clockwise rotation of the actuation shaft 52. This left-to-right motion of the actuation piston 57 is accomplished by increased fluid pressure through the fluid inlet 70. Conversely, increased fluid pressure through the other inlet 71 can cause the actuation piston to travel right to left, resulting in a counter clockwise rotation of the actuation shaft 52.

In one embodiment of the invention, the actuation mechanism 40 is only operable to deploy the flexible tarp. More specifically, increased fluid pressure is applied only at one inlet to cause pivoting of the bail arms in the deployment direction. With this embodiment, the flexible tarp can be returned to its stowed position by actuation of the spring driven retraction roller 14. To permit this retraction movement, the pressure within the hydraulic chamber 65 behind the actuation piston 57 must be relieved.

Figure 5:
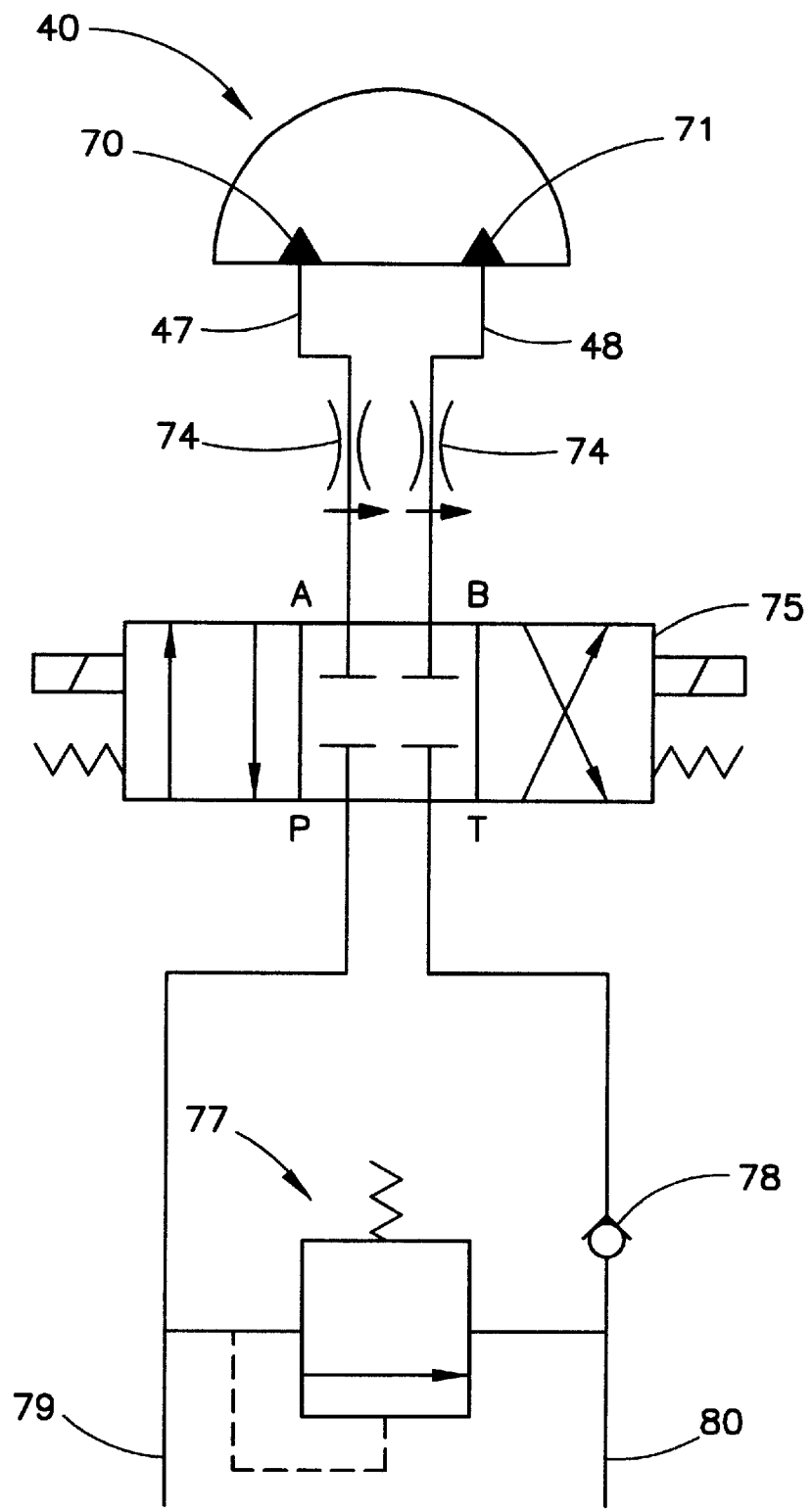
FIG. 5 is a schematic diagram of a hydraulic circuit for controlling the actuator illustrated in FIG. 4.

In an alternative embodiment, a more specific pressure control system is implemented that permits clockwise and counter-clockwise powered rotation of the actuation shaft 52. One such system is depicted in FIG. 5. Specifically, the system can include a pair of flow control valves 74, one each for each of the fluid lines 47 and 48. The flow control valves can be calibrated to control the speed of action of the actuation mechanism 40. For instance, greater flow decreases the actuation time, while a slower flow will increase the time of actuation for the mechanism 40. In the illustrative embodiment, each of the flow control valves 74 can be independently controlled so that deployment actuation can occur faster or slower than retraction movement.

The system shown in FIG. 5 also includes a three-position four-way solenoid valve 75. This valve 75 is configured to permit alternative pressure charging of either fluid inlet 70 or 71. In addition, the solenoid valve 75 can permit bleeding off of the pressure within one half portion of the hydraulic chamber 65. For instance, the solenoid valve 75 can have first and second positions alternatively connecting and disconnecting the fluid inlet 70 from the hydraulic fluid source. The valve can have a third position closing the second fluid inlet 71 and a fourth position that opens the fluid inlet 71 to drain (i.e., return fluid to the fluid source). With this mode of operation, the solenoid valve 75 permits powered deployment of the cover and unpowered retraction that relies upon the return spring of the retraction roller 14 to wind the tarp. Alternatively, the third and fourth positions can connect and disconnect the second fluid inlet 71 from the fluid source to permit powered retraction of the tarp.

The hydraulic system preferably has an inlet line 79 and an outlet line 80. The hydraulic system for the actuator can be integrated into the vehicle hydraulic system. For a dump vehicle, the dump hydraulics can be used to feed the deployment actuator hydraulics. Pressure within the hydraulic chamber 65 is increased by fluid traveling along the inlet line 79 and decreased by fluid being exhausted through outlet 80. The system can further include a relief valve 77 that bleeds fluid pressure directly from the inlet to the outlet, and a check valve 78 that prevents fluid back flow.

Preferably, the flow control system, and more particularly the flow control valves 74, are configured to control the fluid flow rate discharged from one of the inlets, when the opposite inlet is pressurized to deploy the bail arm in the corresponding direction. Thus, with this configuration, the fluid is metered-out, which ensures that sufficient pressure is available to provide controlled movement in the appointed direction. This metering of the out-going fluid from the chamber 65 is particularly important when the bail arm moves over center. At this point, the weight of the bail arm can cause uncontrolled ejection of fluid from the chamber, regardless of the incoming flow rate through the opposite inlet port.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A cover system for an open-topped container, said system comprising:

a flexible cover wound about a spool at one end of the container, said cover sized to span at least a portion of the open-topped container when unwound from said spool;

a bail member attached at one end to said flexible cover and pivotably mountable at an opposite end to the container, said bail member sized to unwind the cover from said spool as said bail member is rotated, wherein said bail member includes a pair of arms disposed at opposite sides of the container;

a hydraulic rotary actuator mounted to the container between the opposite sides of the container and including:

at least one rotatable shaft engaged to said bail member arms;

a body defining a chamber having first and second fluid inlets; and a linearly movable piston disposed within said chamber between said first and second fluid inlets and operably coupled to said at least one rotatable shaft, whereby pressurized fluid provided at said first fluid inlet moves said piston away from said first inlet to thereby rotate said at least one rotatable shaft in one direction, and pressurized fluid provided at said second fluid inlet moves said piston away from said second inlet to thereby rotate said at least one rotatable shaft in an opposite direction; and a control valve system connected between said first and second fluid inlets and a source of pressurized fluid, wherein said control valve system includes a first flow control valve connected to said first fluid inlet and a second flow control valve connected to said second fluid inlet, said first and second control valves selectively and independently operable to differently control the flow rate of fluid through said corresponding first and second inlets.

2. The cover system according to claim 1, wherein said control valve system further includes a multiple position valve connected to said first and second inlets and having a first position connecting said first inlet to the source of pressurized fluid and a second position disconnecting said first inlet from said source of pressurized fluid.

3. The cover system according to claim 2, wherein said multiple position valve has a third position closing fluid inlet and a fourth position opening said second fluid inlet to drain.

4. The cover system according to claim 3, wherein said multiple position valve is configured to meter-out fluid flow from said second fluid inlet to drain.

5. The cover system according to claim 1, wherein said control valve system is selectively operable to connect one of said first and second fluid inlets to a source of pressurized fluid to unwind said cover from said spool and to connect said one of said first and second fluid inlets to a drain to permit operation of a separate retraction mechanism to wind said cover onto said spool.

6. The cover system according to claim 1, wherein said control valve system includes a metering valve between one of said first and second fluid inlets and a drain to meter the rate of fluid flow from said hydraulic rotary actuator to the drain.

7. The cover system according to claim 1, wherein said at least one rotatable shaft comprises a pair of rotatable shafts, said pair of rotatable shafts being rotated together in a same direction.

8. The cover system according to claim 7 wherein said hydraulic rotary actuator includes:

an actuation shaft carrying external helical splines;

internal helical splines defined on said piston and configured for operable engagement with said external helical splines; and means for rotationally connecting said pair of rotatable shafts to said actuation shaft.

9. The cover system according to claim 1, wherein said hydraulic rotary actuator is mounted to the underside of the container.

10. The cover system according to claim 1, wherein said first and second flow control valves are configured to control a fluid flow rate discharged from one of the first and second inlets when the other of the first and second inlets is pressurized.

11. The cover system according to claim 2, wherein said multiple position valve has a third position connecting said second inlet to the source of pressurized fluid and a fourth position disconnecting said second inlet from said source of pressurized fluid.

12. The cover system according to claim 11, wherein said third and fourth positions are configured to permit powered retraction of said flexible cover.

13. A cover system for an open-topped container, said system comprising:

a flexible cover wound about a spool at one end of the container, said cover sized to span at least a portion of the open-topped container when unwound from said spool;

a bail member attached at one end to said flexible cover and pivotably mountable at an opposite end to the container, said bail member sized to unwind the cover from said spool as said bail member is rotated, wherein said bail member includes a pair of arms disposed at opposite sides of the container;

a pair of frame members, each said frame member being disposed adjacent to a respective one of said arms of said bail member;

an actuation mechanism mounted to the container between the opposite sides of the container and including:

an actuator; and a pair of rotatable half shafts coupled to said actuator, one each engaged to a corresponding one of said bail member arms and coupled to a corresponding one of said frame members, said actuator and said pair of rotatable half shafts being conjunctively configured to accommodate variations in distances between said actuator and said frame members.

14. The cover system of claim 13, wherein each said frame member is configured to support at least one of:

an outer end of a respective said half shaft; and a rotational connection between a corresponding said bail member arm and a respective said half shaft.

15. The cover system of claim 13, wherein said actuator includes:

an actuation shaft having two opposite ends; and a pair of shaft mounts, each said shaft mount being associated with a respective one of said two opposite ends of said actuation shaft, each said shaft mount including a respective elongated slot, each said elongated slot being configured to receive a pin of a respective said half shaft.

* * * * *

UNITED STATES PATENT AND TRADEMARK OFFICE
CERTIFICATE OF CORRECTION

PATENT NO.    : 6,578,897 B2
DATED         : June 17, 2003
INVENTOR(S)   : Jeff White It is certified that error appears in the above-identified patent and that said Letters Patent is hereby corrected as shown below:

<u>Column 1,</u>
Line 35, replace "Covers" with -- Cover --

<u>Column 7,</u>
Line 24, insert -- said second -- after "closing"

Signed and Sealed this

Twenty-seventh Day of January, 2004

JON W. DUDAS
*Acting Director of the United States Patent and Trademark Office*